US012687190B2

(12) United States Patent
Tasse Roy

(10) Patent No.: US 12,687,190 B2
(45) Date of Patent: Jul. 21, 2026

(54) TORQUE LIMITING FASTENER

(71) Applicant: PRATT & WHITNEY CANADA CORP., Longueuil (CA)

(72) Inventor: Alexandre Tasse Roy, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 437 days.

(21) Appl. No.: 18/354,800

(22) Filed: Jul. 19, 2023

(65) Prior Publication Data

US 2025/0027523 A1 Jan. 23, 2025

(51) Int. Cl.
F16B 31/02 (2006.01)

(52) U.S. Cl.
CPC ..................................... F16B 31/02 (2013.01)

(58) Field of Classification Search
CPC .............................. F16B 31/02; F16B 31/027
USPC .................................................. 411/6–7, 326
See application file for complete search history.

(56) References Cited

U.S. PATENT DOCUMENTS

| | | | | | |
|---|---|---|---|---|---|
| 1,609,645 | A | * | 12/1926 | Dewire | ................... F16B 39/32 |
| | | | | | 411/533 |
| 2,373,812 | A | * | 4/1945 | Coop | ................... B25B 23/142 |
| | | | | | 411/6 |
| 2,634,650 | A | | 4/1953 | Coop | |
| 2,729,134 | A | * | 1/1956 | Stanton, Jr. | ............. F16B 31/02 |
| | | | | | 411/6 |
| 2,881,602 | A | * | 4/1959 | Baker | ....................... F16K 31/60 |
| | | | | | 464/35 |

| | | | | | |
|---|---|---|---|---|---|
| 3,255,796 | A | * | 6/1966 | Tobey | ...................... F16B 39/10 |
| | | | | | 411/298 |
| 3,343,852 | A | * | 9/1967 | Blight | .................. H01R 13/621 |
| | | | | | 439/321 |
| 4,619,437 | A | * | 10/1986 | Williams | ................ F16K 31/60 |
| | | | | | 251/79 |
| 4,793,319 | A | * | 12/1988 | Vaughan | ............... F41B 5/0026 |
| | | | | | 411/397 |
| 5,154,557 | A | | 10/1992 | Houck | |
| 8,353,498 | B2 | * | 1/2013 | Fukano | ................... F16K 31/60 |
| | | | | | 251/80 |
| 8,545,152 | B2 | | 10/2013 | Kuenkel et al. | |
| 9,651,078 | B2 | | 5/2017 | Santiago-Anadon | |

(Continued)

FOREIGN PATENT DOCUMENTS

| | | |
|---|---|---|
| CN | 106895065 A | 6/2017 |
| CN | 206785836 U | 12/2017 |
| JP | 2000240627 A | 9/2000 |

OTHER PUBLICATIONS

European Search Report issued in counterpart application No. 24189788.3 on Dec. 3, 2024.

*Primary Examiner* — Flemming Saether

(74) *Attorney, Agent, or Firm* — NORTON ROSE FULBRIGHT CANADA LLP

(57) ABSTRACT

An adjustable torque limiting fastener has a shank extending along an axis from a proximal end to a distal end. The fastener has a head at the proximal end of the shank. A torque limiter is integrated between the head and the shank. The torque limiter is operable to rotatably decouple the head from the shank when a torque applied to the head exceed a maximum torque. The maximum torque is set by a spring plunger integrated to the head for friction engagement with the proximal end of the shank.

17 Claims, 3 Drawing Sheets

(56) References Cited

U.S. PATENT DOCUMENTS

| 10,886,675 B2 * | 1/2021 | Ketzer | G01R 1/0416 |
| 11,162,524 B2 * | 11/2021 | Wang | F16B 31/027 |

* cited by examiner

_FIG_.1

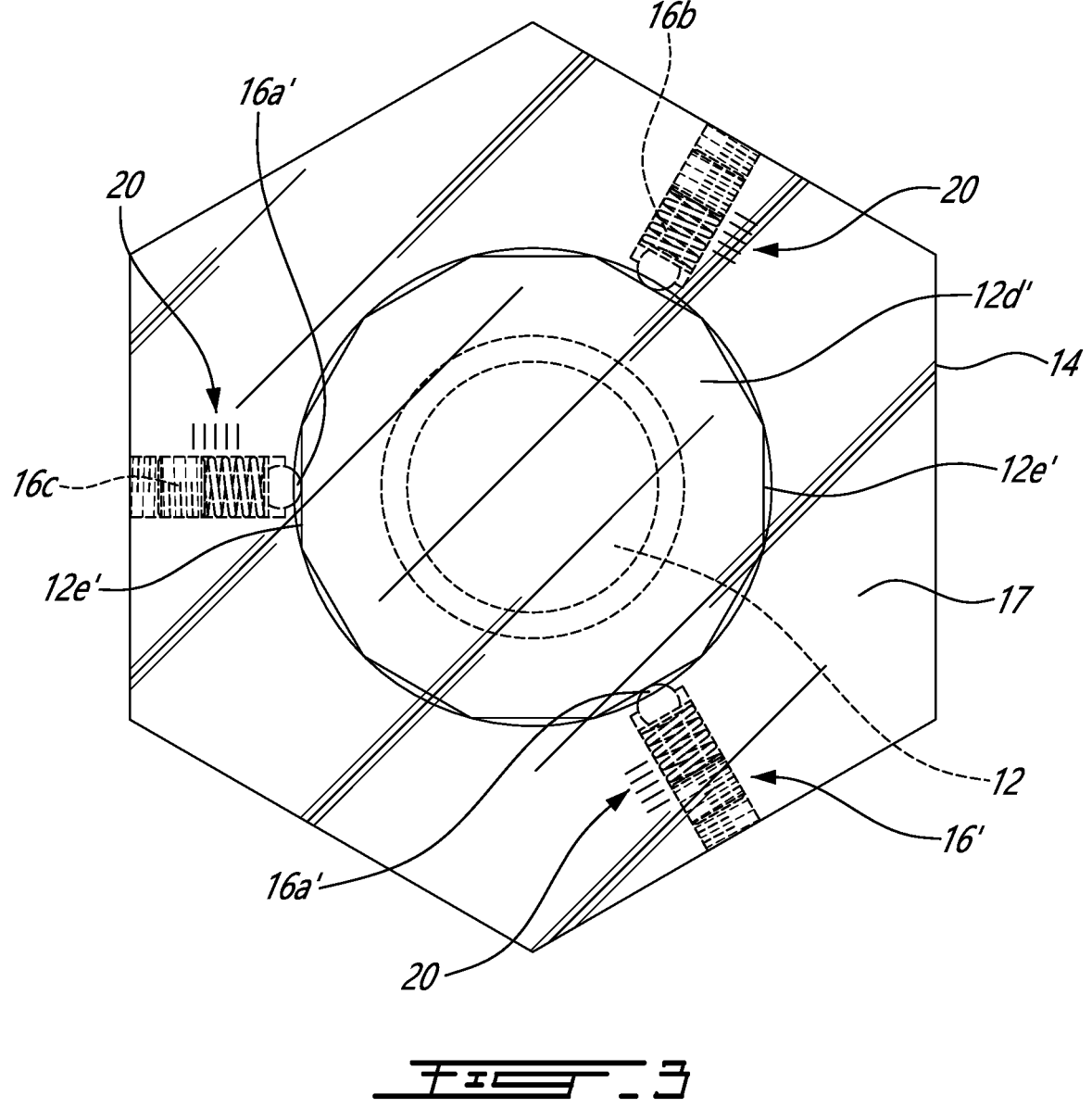
_FIG. 3_

TORQUE LIMITING FASTENER

TECHNICAL FIELD

The application relates generally to fasteners and, more particularly, to a fastener with an integrated torque limiter.

BACKGROUND OF THE ART

Mechanical fasteners, such as bolts and nuts are used in a wide variety of applications. For instance, bolted assemblies are often used in aircraft engines. The bolting of parts typically requires specific levels of bolt tension, which are commonly achieved by correlating bolt stress to a specific bolt torque and measuring it by a torque wrench or the like.

While torque-limiting tools, such as torque wrenches, are effective, there is a continued need for alternatives torque setting structures and methods.

SUMMARY

In one aspect, there is provided a fastener comprising: a shank extending along an axis from a proximal end to a distal end, the shank having a threaded portion at the distal end; a head defining a cavity coaxial with the axis, and a plunger hole transversal to the cavity, the proximal end of the shank extending into the cavity; and a torque limiter between the head and the shank, the torque limiter operable to rotatably decouple the head from the shank when a torque applied to the head exceed a torque limit, the torque limiter comprising: a spring-loaded plunger mounted in the plunger hole, the spring-loaded plunger including a plunger and a compression spring pressing the plunger in engagement with a detent provided on the proximal end of the shank; and an adjustment screw threadably engaged with a threaded portion of the plunger hole, the adjustment screw adjustable in the plunger hole to adjust a compression of the compression spring.

In another aspect, there is provided a fastener comprising: a shank extending along an axis from a proximal end to a distal end; a head at the proximal end of the shank; and a torque limiter between the head and the shank, the torque limiter operable to rotatably decouple the head from the shank when a torque applied to the head exceed a maximum torque, the maximum torque set by a spring plunger integrated to the head for friction engagement with the proximal end of the shank.

In a further aspect, there is provided an adjustable torque limiting bolt comprising: a shank extending along an axis from a proximal end to a distal end, the shank having a threaded portion at the distal end; a head defining a cavity, the proximal end of the shank extending into the cavity; and a torque limiter integrated to the head for rotatably decoupling the head from the shank when a torque applied to the head exceed a pre-set torque, the torque limiter including one or more ball detents, a first one of the one or more ball detents including a spring urging a ball in engagement with a detent provided at the proximal end of the shank inside the cavity of the head, the spring operatively connected to an adjustment screw threadably engaged with the head, the adjustment screw operable to adjust the pre-set torque by varying a compression of the spring.

DESCRIPTION OF THE DRAWINGS

Reference is now made to the accompanying figures in which:

FIG. 3 is a top plan view illustrating a variant of the adjustable torque limiter of the fastener.

DETAILED DESCRIPTION

Over and under tightening of mechanical fasteners, such as bolts and nuts, may lead to assembly failure. Indeed, over torqueing a fastener can lead to fastener breakage by torsional shear of the body of the fastener as well as drive head stripping rendering further tightening or loosening of the fastener impossible. On the other hand, under tightening of fasteners can lead to failure of adequately joining members, machine failure due to vibrations, reduced performance and early failure of components.

Moreover, the operator has typically no way of knowing if the fastener has been properly tightened without looking up a tightening torque value and using a tool, such as a torque limiting wrench. Such torque limiting wrenches are expensive and require calibration. Furthermore, their ability to properly limit the torque depends on components which can degrade over time or when exposed to severe conditions, such as corrosion and high temperatures.

Figure 1:
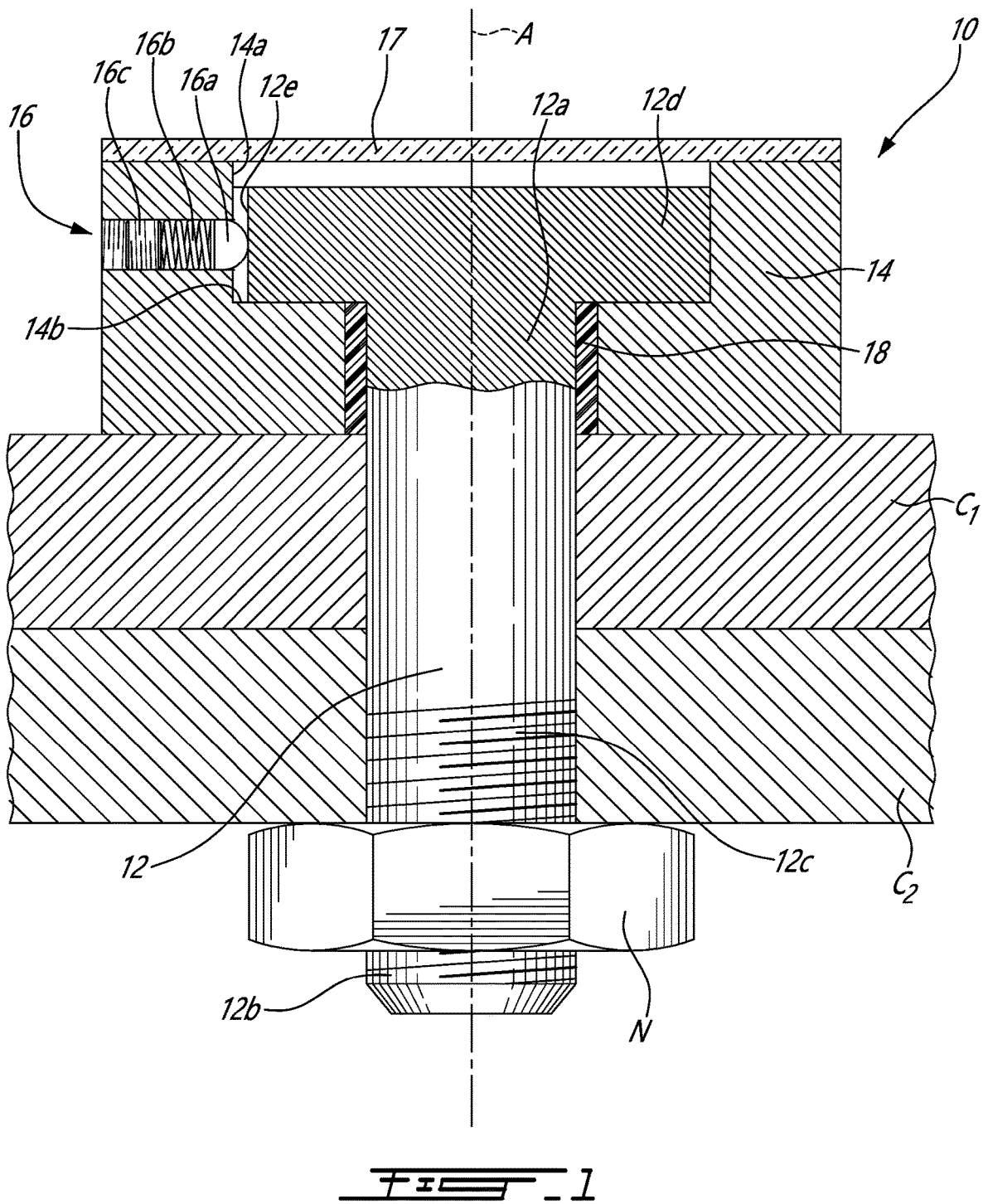
FIG. 1 is a schematic cross-section view of a fastener with a built-in adjustable torque limiter.

FIG. 1 illustrates an example of a fastener 10 with an integrated torque limiter. Such a torque-limiting fastener obviates the need for a calibrated torque-limiting tool to tighten the fastener to a pre-set torque. That is the fastener 10 can be precisely tighten to a predetermined torque without the use of specialized tooling. As will be seen hereinafter, according to at least some embodiments, the built-in torque limiter of the fastener 10 can be configured to provide for the adjustment of the torque limit of the fastener 10. In this way, a same fastener can be used in applications requiring different tightening torques.

Figure 2:
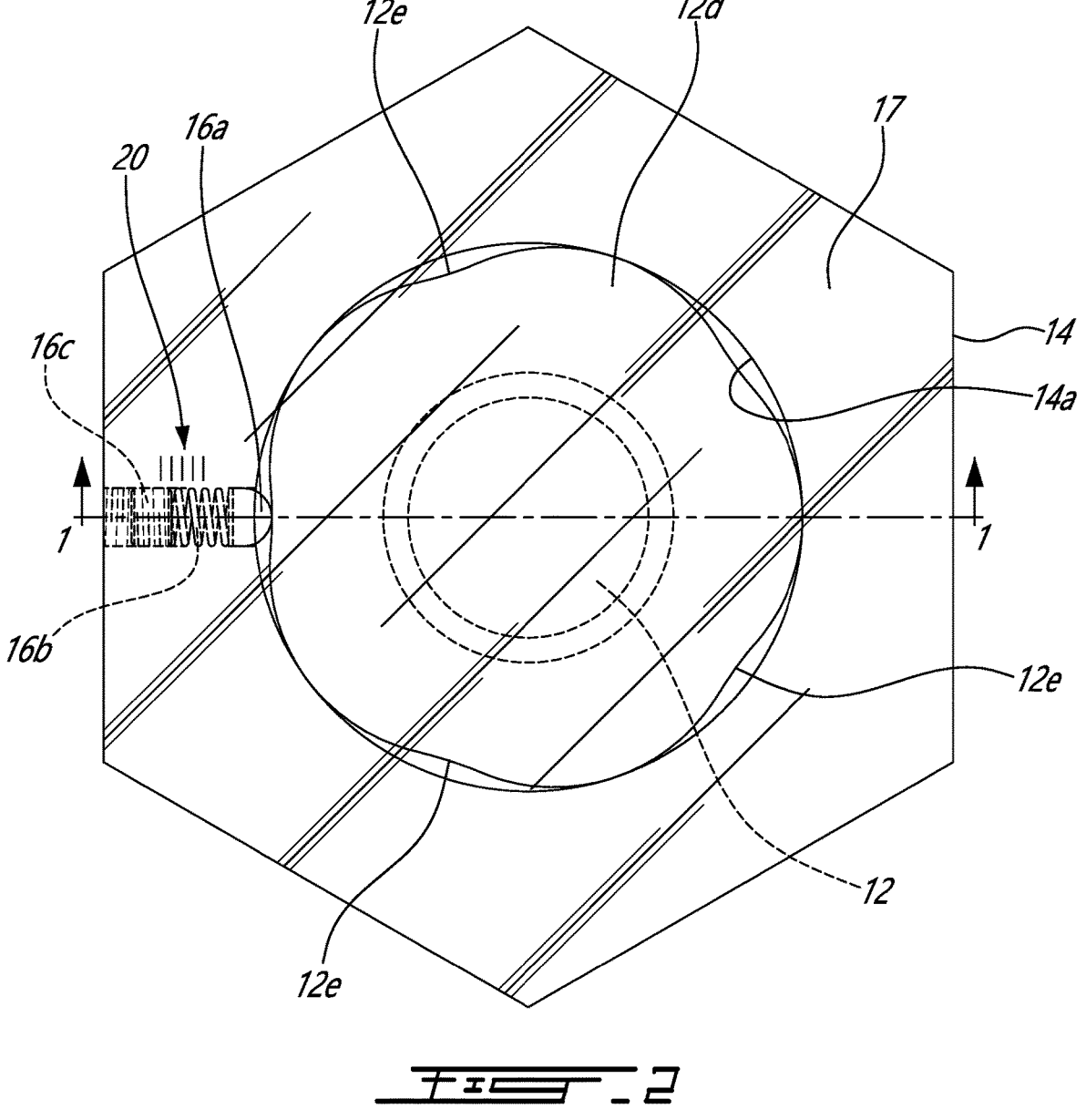
FIG. 2 is a top plan view of the fastener illustrating a scale for adjusting a torque limit of the fastener to a desired value.

According to example illustrated in FIGS. 1 and 2, the fastener 10 is provided in the form of a bolt threadably engaged with a nut N for clamping a first component C1 to a second component C2. However, the skilled person will understand that this is only one potential application of the fastener 10.

The exemplified fastener 10 comprises an externally threaded shank 12 and a drive head 14 rotatably coupled to the shank 12 via a torque limiter 16. As will be seen hereinafter, the torque limiter 16 is operable to automatically rotatably disconnect the head 14 from the shank 12 when a torque applied to the head 14 exceeds a pre-set torque value.

The drive head 14 can adopt various geometries for engagement with a driver tool (e.g., a wrench). For instance, the perimeter of the head 14 can be hexagonal or of any other geometries suitable for engagement with a torque driving tool. Alternatively, in certain applications, for instance where the fastener is to be tightened by hand, the head 14 can be cylindrical. A textured surface finish can also be applied to the head 14 to improve traction between the head and the driving source. For instance, the head 14 can have a knurled surface finish.

The shank 12 extends axially along an axis A from a proximal end 12a to a distal end 12b opposite to the head 14. The shank 12 has a threaded portion 12c extending axially from the distal end 12b towards the head 14 for threaded engagement with mating internal threads of the nut N. The threaded portion 12c can be provided along only a portion of the length of the shank 12 or along the full extent thereof.

The proximal end 12*a* of the shank 12 projects coaxially into an open-ended central bore or cavity 14*a* defined in the head 14. A projection 12*d*, which can take the form of a collar, a flange or wheel to name a few, is integrally formed or otherwise suitably fixed to the proximal end 12*a* of the shank 12 so as to form a unitary body therewith. The projection 12*d* is axially trapped within the cavity 14*a* between an annular arresting shoulder 14*b* projecting from an inner surface of the cavity 14*a* and a cap 17 securely mounted atop of the head 14 for sealingly closing the top end of the cavity 14*a*. A low-friction bushing 18 is fitted over the shank 12 underneath the projection 12*d* for sealingly closing a reduced diameter bottom end portion of the cavity 14*a*. The cap 17 and the bushing 18 prevent contaminants from entering the cavity 14*a*.

Referring jointly to FIGS. 1 and 2, it can be seen that the torque limiter 16 may be provided in the form of a mechanical arrangement operating as a "slip clutch" or the like for holding the head 14 in a fixed position relative to the shank 12 until the torque applied to the head 14 reaches a pre-set torque limit. For instance, the torque limiter 16 may comprise one or more spring-loaded plungers mounted in corresponding cylindrical bores or plunger holes intersecting the cavity 14*a* in the head 14 of the fastener 10. According to the illustrated example, one spring plunger is mounted in a plunger hole extending transversally (e.g., perpendicularly) to the axis A. The exemplified spring plunger generally includes a plunger 16*a* sliding within a bored cylinder, against the pressure of a compression spring 16*b* (e.g., a helical spring), which pushes the plunger 16*a* against the peripheral surface of the projection 12*d* at the proximal end 12*a* of the shank 12 of the fastener 10. The shank 12 may be provided with one or more mating detents 12*e* to increase the load capacity of the torque limiter 16 (i.e., increase resistant to movement between the head 14 and the shank 12). When a detent 12*e* is aligned with the spring-loaded plunger, the plunger 16*a* is pushed against the aligned detent 12 under spring pressure, holding the parts at that position. As long as the spring force is not overcome, the plunger 16*a* remains firmly pressed in frictional engagement with the detent 12 and, thus, the torque applied to the head 14 is transferred to the shank 12 (i.e. the head 14 and the shank 12 rotate as a unitary body). However, when the torque applied to the head 14 overcomes the retention force (e.g., a surface contact force between the plunger 16*a* and the detent 12*e*) exerted by the spring-loaded plunger on the shank 12, then the plunger 16*a* retracts against the spring 16*b* to a depressed position into its cylinder, thereby allowing the head 14 to slip relative to the shank 12 (i.e., the head 14 is rotationally decoupled from the shank 12).

The plunger 16*a* can take various forms. For instance, as shown in FIGS. 1 and 2, the plunger 16*a* may be provided in the form of a bullet head. Alternatively, the plunger can be provided in form of a hardened ball, a roller or any other pressure applying tip elements suitable to apply sufficient pressure onto the shank 12 of the fastener 10 to rotatably couple the same to the head 14 of the fastener 10 within a specified range of tightening torques.

The detent 12*e* can also adopt various configurations. As shown in FIGS. 1 and 2, the projection 12*d* can be provided in the form of a wheel having a peripheral surface extending circumferentially about the axis A, and the detent 12*e* may include a plurality of circumferentially distributed depressions or recesses in the peripheral surface of the wheel. Other alternatives are contemplated. For instance, as shown in FIG. 3, the detents may be provided as flattened areas or flats on the outer circumference of the shank 12.

Referring back to FIGS. 1 and 2, it can be appreciated that the compression of the spring-loaded plunger (and therefore the amount of torque at which the torque limiter 16 is set) may be adjusted by means of an adjustment screw 16*c* accessible to the user from a side of the head 14. The pressure (i.e., the load capacity) of the spring plunger is set by turning the screw 16*c*. This compresses the spring 16*b* and sets up a force that opposes the motion of the head 14 relative to the shank 12. The adjustment screw 16*c* is threadably engaged with internal mating threads formed in the plunger receiving bore/hole defined in the head 14. The spring 16*b* is compressed between the tip of the screw 16*c* and the plunger 16*a*. Accordingly, by tightening or untightening the adjustment screw 16*c*, the insertion depth of the screw 16*c* and, thus, the compression of the spring 16*b* may be adjusted. This allows adjusting the value of the torque limit at which the head 14 starts to slip relative to the shank 12. The adjustment screw 16*c* may have any type of drive, such as hex or square head, slot, or recessed—cross (Phillips), hex (Allen), star (Torx), or square (Robertson).

As shown in FIG. 2, a visual scale 20 may be provided on the cap 17 to allow the user to correlate an insertion depth of the adjustment screw 16*c* to a torque limit value at which the torque limiter 16 rotationally decouples the head 14 from the shank 12. To that end, the cap 17 may be at least partly transparent to allow the user to see the insertion depth of the adjustment screw 16*c* in relation to the graduation or scale markings provided along the spring-loaded plunger. Each mark can correspond to a torque limit value. In this way, the user, even when in the field, can readily adjust the torque limit of the fastener 10 to a desired value.

In operation, the plunger 16*a* is held in its detent 12*e* by the spring force pre-adjusted with the adjustment screw 16*c*. The head 14 and the shank 12 of the fastener 10 rotate as a unitary component until the pre-set torque is reached. When the torque applied to the head 14 starts to exceed the pre-set limit, the spring force is overcome, and the plunger 16*a* is pushed out of its detent 12*e*, thereby rotatably disconnecting the head 14 from the shank 12. That is when the torque applied to the head 14 reaches a determinate amount preadjusted with the adjustment screw 16*c*, the torque acting on the head 14 causes the head to "unlock" from the shank 12, causing the head 14 to slip relative to the shank 12, thereby effectively rotatably decoupling the head 14 from the shank 12. It can be appreciated that such a mechanism allows tightening a fastener, such as a bolt, at a pre-set torque value without the use of a special tool, such as a torque-limiting wrench. The torque can be set precisely by anyone without particular tooling knowledge. By integrating the torque limiter 16 directly in the head of the fastener 10, the number of parts may be reduced.

FIG. 3 illustrates possible variants that may be incorporated into the adjustable torque-limiting fastener. For instance, the torque limiter may be provided in the form of one or more ball detent type limiters circumferentially distributed about the shank 12 inside the head 14 of the fastener. A ball detent type limiter transmits force through hardened balls 16*a'* (e.g., metal spheres or other equivalent tip or nose features) which are pressed against detents on the shank 12 and are held in place with springs 16*b*. An over-torque condition causes the balls 16*a'* to slip out of their detents, thereby decoupling the head 14 from the shank 12. Like the above described torque limiter, each ball detent type limiter may include an adjustment screw 16*c* to individually adjust the torque limiters 16' to a determined torque limit.

A series of spring-loaded balls 16*a'* (three in the illustrated example) act on an outer surface of the shank 12 to rotationally couple the head 14 to the shank 12, thereby allowing a torque to be transmitted from the head 14 to the shank 12. As illustrated, the detents can be provided in the form of flats 12e' at the periphery of a flange 12d' projecting from the proximal end of the shank 12. However, it is understood that the detents could adopt other configurations. For instance, as described herein above, each detents could be provided in the form of a depression/recess in the outer surface of the shank 12. According to the illustrated example, the fastener includes 12 flats for 3 balls. However, it is understood that any suitable detent/ball ratios is contemplated.

The use of multiple torque limiters 16' may provide for greater torque limits. The provision of multiple detents around the shank may provide for greater adjustability of the torque limit.

The above-described torque limiting fasteners and its variants could be used to simplify maintenance activity and tooling and to minimize the risk of erroneous torqueing. Indeed, at least some of the embodiments allows to simplify and accelerate the removal and installation of fasten/bolted connections and eliminate the use of a torque wrench with a fastener/bolt which includes a mechanism that limit the torque. In addition to the adjustment capacity provided by the adjustment screw 16c, the torque limit of the fastener could also be modified (increased or lowered) by changing the spring 16b for a spring having a different spring force.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, it is understood that while the features of the instant technology have been described in the context of a bolt, similar principles could be applied to other types of mechanical fasteners, such as screws, bolts and the like. Yet further modifications could be implemented by a person of ordinary skill in the art in view of the present disclosure, which modifications would be within the scope of the present technology.

The invention claimed is:

1. A fastener comprising:
   a shank extending along an axis from a proximal end to a distal end, the shank having a threaded portion at the distal end;
   a head defining a cavity coaxial with the axis, and a plunger hole transversal to the cavity, the proximal end of the shank extending into the cavity, wherein the cavity has an open end on a side of the head opposite to the shank, and wherein the open end of the cavity is closed by a cap mounted to the head;
   a wheel fixed to the proximal end of the shank inside the cavity of the head, the wheel axially retained captive inside the cavity by the cap;
   a torque limiter between the head and the wheel, the torque limiter operable to rotatably decouple the head from the wheel when a torque applied to the head exceed a torque limit, the torque limiter comprising:
      a spring-loaded plunger mounted in the plunger hole, the spring-loaded plunger including a plunger and a compression spring pressing the plunger in engagement with a detent provided on the wheel; and
      an adjustment screw threadably engaged with a threaded portion of the plunger hole, the adjustment screw adjustable in the plunger hole to adjust a compression of the compression spring.

2. The fastener of claim 1, wherein the compression spring is held in compression between the adjustment screw and the plunger, the adjustment screw operable to vary a force exerted by the compression spring on the plunger.

3. The fastener of claim 1, wherein the detent includes a circumferential array of depressions defined in an outer surface of the wheel, the plunger engageable in the depressions to clamp the head to the shank.

4. The fastener of claim 3, wherein the circumferential array of depressions are formed in a circumferential peripheral surface of the wheel about the axis.

5. The fastener of claim 4, further comprising a bushing fitted over the proximal end of the shank inside the cavity of the head, the bushing axially adjacent to the wheel.

6. The fastener of claim 1, wherein the cap is at least partly transparent over the spring-loaded plunger, and wherein a visual scale including graduated markings is provided on the cap along a length of the spring-loaded plunger to correlate an insertion depth of the adjustment screw to the torque limit to be applied on the head to overcome a coupling force exerted by the spring-loaded plunger on the wheel.

7. The fastener of claim 1, wherein the wheel is axially trapped between the cap and an inner annular arresting shoulder formed in the cavity.

8. The fastener of claim 1, wherein the plunger includes a ball or a rounded tip projecting partly out from the plunger hole into the cavity for engagement with the detent.

9. A fastener comprising:
   a shank extending along an axis from a proximal end to a distal end;
   a head at the proximal end of the shank; and
   a wheel secured to the proximal end of the shank inside a cavity defined in the head;
   a bushing fitted over the proximal end of the shank inside the cavity of the head, the bushing axially adjacent to the wheel; and
   a torque limiter between the head and the wheel on the shank, the torque limiter operable to rotatably decouple the head from the shank when a torque applied to the head exceed a maximum torque, the maximum torque set by a spring plunger integrated to the head for friction engagement with the wheel at the proximal end of the shank.

10. The fastener of claim 9, wherein the spring plunger comprises a compression spring disposed in a plunger hole defined in the head of the fastener, a plunger pressed by the compression spring against the proximal end of the shank, and an adjustment screw threadably engaged with mating threads defined in the plunger hole, the adjustment screw operatively connected to the compression spring to adjust a compression level of the compression spring.

11. The fastener of claim 10, wherein the plunger hole intersects the cavity, the plunger partially projecting out from the plunger hole into the cavity for friction engagement against the wheel secured to the proximal end of the shank.

12. The fastener of claim 11, wherein the compression spring urges the plunger in friction contact against a circumferential surface of the wheel.

13. The fastener of claim 12, wherein the circumferential surface has a plurality of circumferentially distributed detents, the plunger engageable with the detents.

14. An adjustable torque limiting bolt comprising:
   a shank extending along an axis from a proximal end to a distal end, the shank having a threaded portion at the distal end;

a head defining a cavity, the proximal end of the shank extending into the cavity; and a torque limiter integrated to the head for rotatably decoupling the head from the shank when a torque applied to the head exceed a pre-set torque, the torque limiter including one or more ball detents, a first one of the one or more ball detents including a spring urging a ball in engagement with a detent provided at the proximal end of the shank inside the cavity of the head, the spring operatively connected to an adjustment screw threadably engaged with the head, the adjustment screw operable to adjust the pre-set torque by varying a compression of the spring; and wherein the first one of the one or more ball detents comprises a visual scale, the visual scale correlating the pre-set torque to an insertion depth of the spring.

15. The adjustable torque limiting bolt of claim 14, wherein the one or more ball detents comprise an array of ball detents circumferentially distributed about the shank inside the head, each ball detents of the array of ball detents being individually adjustable.

16. The adjustable torque limiting bolt of claim 14, wherein the cavity is closed by a cap mounted to the head, the visual scale including graduations provided on the cap.

17. The adjustable torque limiting bolt of claim 14, wherein the proximal end of the shank comprises a wheel, the one or more ball detents frictionally engaged with a circumferentially extending peripheral surface of the wheel, the wheel retained axially captive within the cavity.

\* \* \* \* \*